US005591242A

United States Patent [19]

Kuo

[11] Patent Number: 5,591,242

[45] Date of Patent: Jan. 7, 1997

[54] SMOKE PROCESSOR

[76] Inventor: Chi L. Kuo, P.O. Box 82-144, Taipei, Taiwan

[21] Appl. No.: 524,512

[22] Filed: Sep. 7, 1995

[51] Int. Cl.[6] .................................................... B01D 29/56

[52] U.S. Cl. ................................ 55/318; 55/354; 55/356; 55/385.8; 55/471; 55/472

[58] Field of Search ............................. 55/318, 351, 354, 55/356, 385.8, 467, 471, 472, 481, 493

[56] References Cited

U.S. PATENT DOCUMENTS

| | | | |
|---|---|---|---|
| 2,040,758 | 5/1936 | Naugler | 55/354 |
| 2,243,637 | 5/1941 | Landis et al. | 55/471 X |
| 2,387,893 | 10/1945 | Ellis | 55/354 |
| 2,782,612 | 2/1957 | Spiegelhalter | 55/354 X |
| 3,516,232 | 6/1970 | Gilbertson | 55/467 X |
| 3,966,442 | 6/1976 | Waters | 55/318 X |
| 4,154,251 | 5/1979 | Doyel | 55/467 X |
| 4,163,650 | 8/1979 | Watson et al. | 55/356 X |
| 4,177,045 | 12/1979 | Orel | 55/318 X |
| 4,512,245 | 4/1985 | Goldman | 55/356 X |
| 4,623,367 | 11/1986 | Paulson | 55/385.8 |
| 4,894,071 | 1/1990 | Klein | 55/351 X |
| 5,085,134 | 2/1992 | Hofstra et al. | 55/385.8 X |
| 5,088,508 | 2/1992 | Duncan | 55/385.8 X |
| 5,217,513 | 6/1993 | Armbruster | 55/351 X |
| 5,281,246 | 1/1994 | Ray et al. | 55/356 X |
| 5,312,465 | 5/1994 | Riutta | 55/356 X |
| 5,325,876 | 7/1994 | Yang | 55/385.8 X |

FOREIGN PATENT DOCUMENTS

| | | | |
|---|---|---|---|
| 63-080824 | 4/1988 | Japan | 55/356 |
| 6-254325 | 9/1994 | Japan | 55/385.8 |

*Primary Examiner*—Robert Spitzer
*Attorney, Agent, or Firm*—Alfred Lei

[57] ABSTRACT

A smoke processor including a housing having a recess, an exhaust fan arranged with the housing, a filter mounted within the housing and located above the exhaust fan, a smoke processing container fitted in the recess of the housing, a flexible pipe connecting the smoke processing container with the filter, a cigarette lighter mounted in the smoke processing container, a linking rod having an upper end pivotally connected with the smoke processing container, a rotating disc rotatably connected with a lower end of the linking rod, and a fixed disc engaged with the rotating disc and mounted within the housing, whereby the smoke exhaled by the smoker can be effectively purified thus preventing air pollution,

5 Claims, 5 Drawing Sheets

SMOKE PROCESSOR

BACKGROUND OF THE INVENTION

1. Field of the invention

This invention is directed to a smoke processor which can effectively filter the smoke exhaled by the smoker.

2. Description of the Prior Art

The U.S. Surgeon General issued a report that condemned cigarettes as causing cancer and several respiratory diseases. Despite this report and other deterrents such as antismoking campaigns, a ban on television advertising, and warning labels on packages, cigarette consumption has continued to increase. Hence, it is a tendency that no body is allowed to smoke in public places thereby making those addicted to smoking habit difficult to adapt to the situation.

Therefore, it is an object of the present invention to provide a smoke processor which can purify the smoke exhaled by a smoker.

SUMMARY OF THE INVENTION

This invention relates to a smoke processor.

It is the primary object of the present invention to provide a smoke processor which can effectively filter the smoke exhaled by the smoker.

It is another object of the present invention to provide a smoke processor which can prevent air pollution.

It is still another object of the present invention to provide smoke processor which is convenient in use.

It is still another object of the present invention to provide a smoke processor which is simple in construction.

It is a further object of the present invention to provide a smoke processor which is facile to manufacture.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
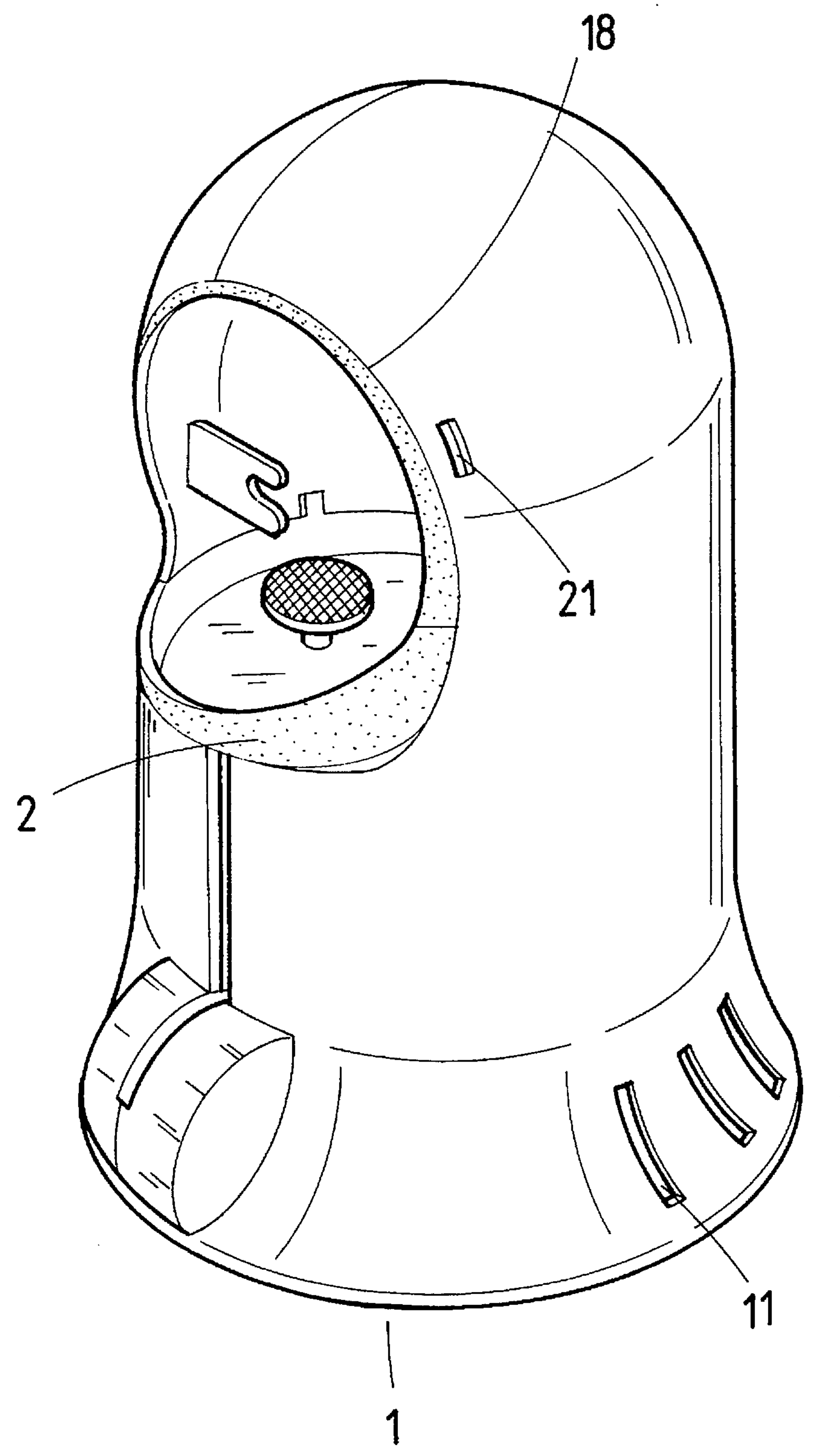
FIG. 1 is a perspective view of a smoke processor according to the present invention.

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
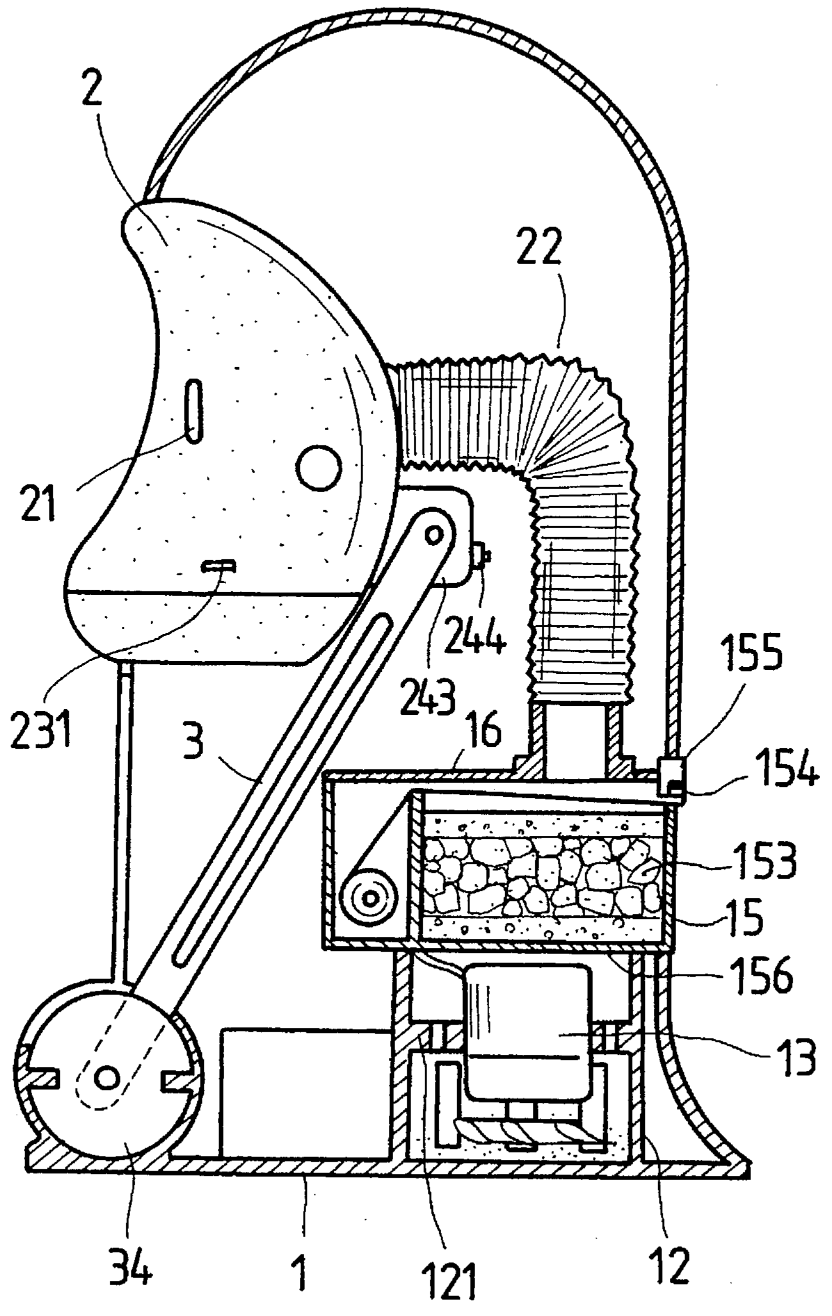
FIG. 2 is a sectional view of the smoke processor.

With reference to the drawings and in particular to FIGS. 1 and 2 thereof, the smoke processor according to the present invention comprises a housing 1 which is composed of two halves. The housing 1 is formed with a recess 18 at the upper portion for receiving a smoke processing container 2. The smoke processing container 2 is provided with a projection 21 engageable with a slot of the housing 1 so that the smoke processing container 2 can be kept within the housing 1 and can be disengaged from the housing 1 by actuating the linking rod 3. When in use, the smoke exhaled by the smoker is passed into the housing through the smoke processing container 2, then cleaned by the filter within the housing 1 and exhausted through the openings 11 at the bottom of the housing 1.

Figure 3:
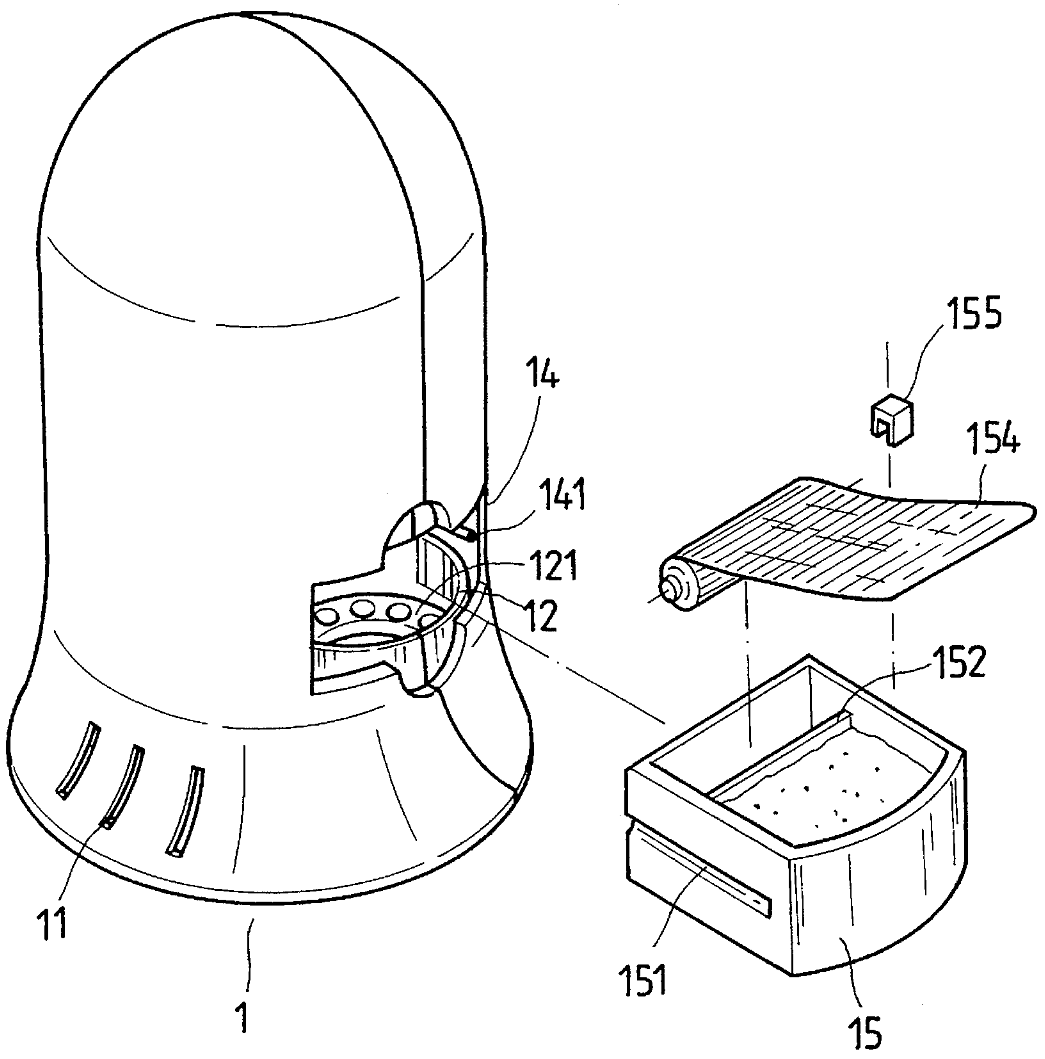
FIG. 3 is a perspective view of the smoke processor, with the filter disengaged from the housing.

Referring to FIGS. 2 and 3, the housing 1 is formed with a chamber 12 communicated with the openings 11 of the housing 1 and having an upper wall 121 on which is mounted an exhaust fan 13 for drawing off air out of the housing 1 through the openings 11. The lower portion of the housing 1 has a cavity 14 formed with an elongated portion 141 at two opposite sides. A filter 15 having a groove 151 at both side is fitted in the cavity 14, with its grooves adapted to engage respective elongated portions 141. The interior of the filter 15 is divided into two chambers by a partition 152. The first chamber is used for receiving a filtering substance composed of filtering cotton, activated carbon, etc., while the second chamber for receiving a rolling of filtering paper 154. The filtering paper 154 is pulled to cover the filter 15 and kept on the outer edge of the filter 15 by an inverted U-shaped member 155. The bottom of the filter 15 is formed with a plurality of perforations 156 which are communicated with the chamber 12. A flexible pipe 22 is connected with the upper wall 16 of the cavity 14 at one end and with the smoke processing container 2 at the other so that the smoke can flow to the filter 15 from the smoke processing container 2.

Figure 4:
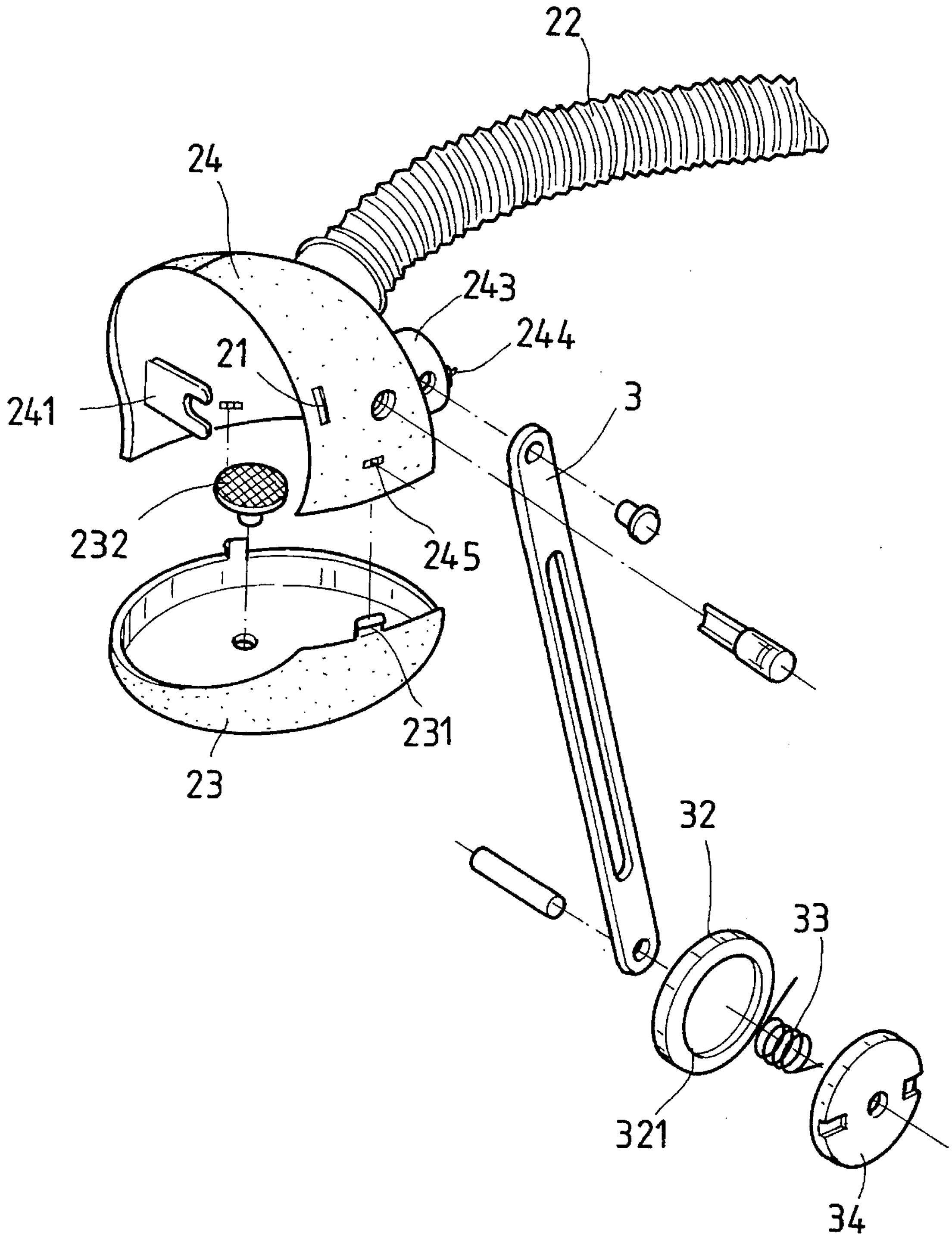
FIG. 4 is an exploded view of the smoke processor.

Looking now at FIGS. 2 and 4, the smoke filtering container 2 includes a lower cover 23 having two hook portions 231 at the upper edge and an upper cover 24 having two slots 245 adapted to engage with respective hook portions 231 of the lower cover 23. The upper cover 24 is connected with an end of the flexible pipe 22. A cigarette holder 241 is arranged on the inner wall of the upper cover 24. A cigarette lighter 243 which has a control switch 244 at the outer end is mounted at the rear portion of the upper cover 24. A distinguishing seat 232 is mounted on the lower cover 23 and has a rough upper surface making it easier to distinguish a cigarette. When not in use, the smoke processing container 2 is fitted within the housing 1, with its projection 21 engaged with the slot of the housing 1.

The upper cover 24 of the smoke filtering container 2 is pivotally connected with an end of a linking rod 3. The other end of the linking rod 3 is connected with a rotating disc 32 and a fixed disc 34 by a pin. Between the rotating disc 32 and the fixed disc 34 there is a torsional spring 33. The rotating disc 32 and the fixed disc 34 are arranged within the lower portion of the housing 1 and located right under the recess 18. The fixed disc 34 is fixedly mounted with in the lower portion of the housing 1. The inner side of the rotating disc 32 is applied with damping grease 321. Hence, when the projection 21 is pressed to release the smoke processing container 2 from the housing 1, the torsional spring 33 will turn the rotating disc 32 thereby pushing the smoke processing projection 21 out of the housing 1. The damping grease 321 is used for slowing the motion of the linking rod 3.

Figure 5:
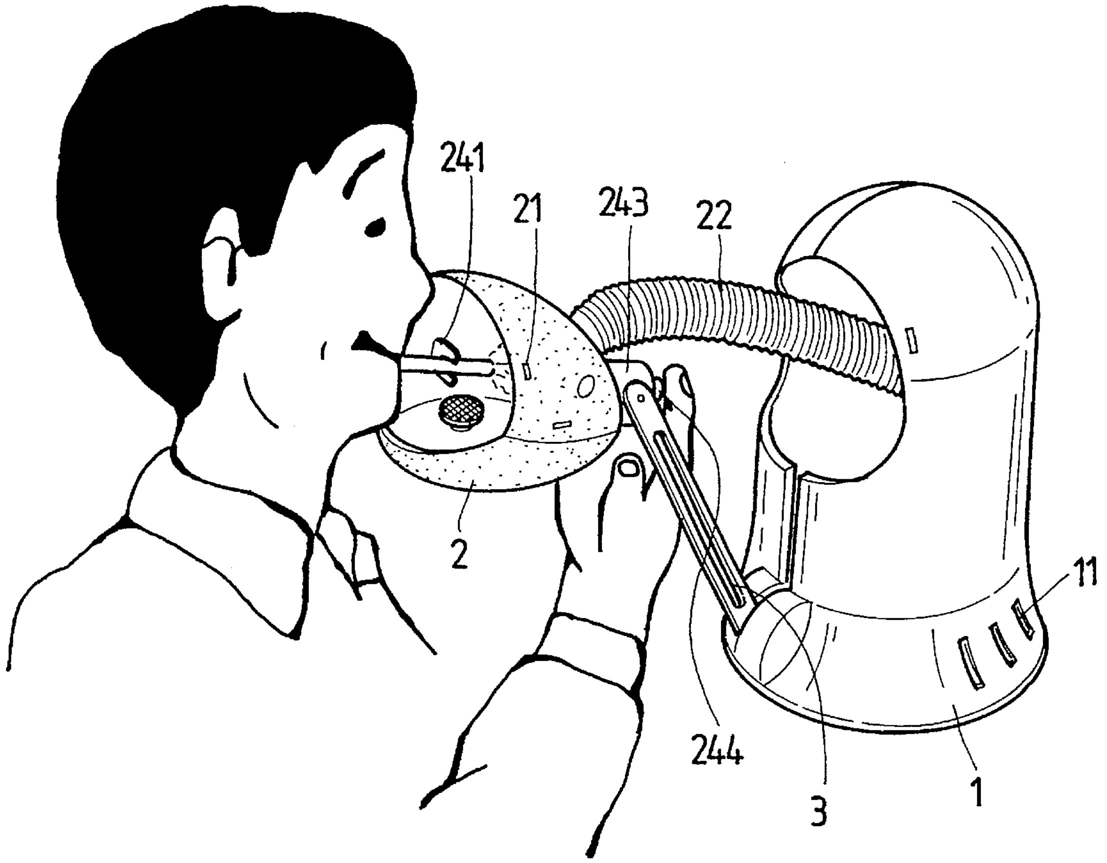
FIG. 5 is a working view of the smoke processor.

When in use, it is only necessary to press the projection 21 to disengage the smoke filtering container 2 from the housing 1 (see FIG. 5). In the meantime; the torsional spring 33 forces the rotating disc 32 to rotate which in turn pushes the smoke processing container 2 out the recess 18 of the housing 1. Then, a cigarette is mounted on the cigarette holder 241 and lit by the cigarette lighter 243. Thereafter, one can smoke and exhale the smoke to the smoke processing container 2. Then, the smoke is passed into the filter 15 through the flexible pipe 22 and exhausted out of the openings 11 of the housing 1 by the exhaust fan 13 thereby purifying the smoke.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A smoke processor comprising:

a housing having a recess;

an exhaust fan arranged with said housing;

a filter mounted within said housing and located above said exhaust fan;

a smoke processing container fitted in the recess of said housing;

a flexible pipe connecting said smoke processing container with said filter;

a cigarette lighter mounted in said smoke processing container;

a linking rod having an upper end pivotally connected with said smoke processing container;

a rotating disc rotatably connected with a lower end of said linking rod; and a fixed disc engaged with said rotating disc and mounted within said housing.

2. The smoke processor as claimed in claim 1, further comprising a torsional spring urging against said rotating disc.

3. The smoke processor as claimed in claim 1, wherein said smoke processor is provided with a cigarette holder.

4. The smoke processor as claimed in claim 1, wherein said smoke processing container is composed an upper cover and a lower cover.

5. The smoke processor as claimed in claim 1, wherein said smoke processing container is snap-fitted with said housing.

* * * * *